(12) United States Patent
Perttunen

(10) Patent No.: US 6,675,202 B1
(45) Date of Patent: Jan. 6, 2004

(54) METHODS, ARTICLES AND APPARATUS FOR PROVIDING A BROWSING SESSION

(76) Inventor: Cary D. Perttunen, 11764 Raintree Ct., Shelby Township, MI (US) 48315

( * ) Notice: Subject to any disclaimer, the term of this patent is extended or adjusted under 35 U.S.C. 154(b) by 813 days.

(21) Appl. No.: 09/580,703

(22) Filed: May 30, 2000

(51) Int. Cl.$^7$ .............................................. G06F 13/00
(52) U.S. Cl. .......................... 709/217; 707/1; 707/10; 345/713; 345/853; 345/855
(58) Field of Search ................................. 709/217, 245; 345/712, 713, 853, 854, 855; 707/1, 10, 100

(56) References Cited

U.S. PATENT DOCUMENTS

| | | | |
|---|---|---|---|
| 5,675,733 A | | 10/1997 | Williams |
| 5,781,909 A | * | 7/1998 | Logan et al. ............... 707/200 |
| 5,802,299 A | * | 9/1998 | Logan et al. ............... 709/218 |
| 5,924,116 A | * | 7/1999 | Aggarwal et al. .......... 711/122 |
| 5,987,469 A | | 11/1999 | Lewis et al. |
| 6,104,400 A | | 8/2000 | Halachmi et al. |
| 6,144,962 A | | 11/2000 | Weinberg et al. |
| 6,145,000 A | | 11/2000 | Stuckman et al. |
| 6,359,635 B1 | | 3/2002 | Perttunen |
| 6,441,834 B1 | * | 8/2002 | Agassi et al. ............... 345/764 |
| 6,460,033 B1 | | 10/2002 | Perttunen |
| 6,466,918 B1 | * | 10/2002 | Spiegel et al. ................ 705/27 |
| 6,489,968 B1 | * | 12/2002 | Ortega et al. ............... 345/713 |

OTHER PUBLICATIONS

Johnson et al., Applied Multivariate Statistical Analysis, 1982, pp. 532–573, Prentice–Hall, Englewood Cliffs.
Tucker, Applied Combinatorics, Second Edition, 1984, pp. 28–31 and 80–131, John Wiley & Sons, New York.
Luger et al., Artificial Intelligence and the Design of Expert Systems, 1989, pp. 88–99, Benjamin/Cummings Publishing, Redwood City.
CRC Standard Mathematical Tables and Formulae, 29$^{th}$ Edition, 1991, pp. 106–107, CRC Press, Boca Raton.
American Heritage Dictionary of the English Language, Third Edition, 1992, inside back cover, Houghton Mifflin, Boston.
"The best chart type for my data," help screen from Microsoft Excel for Windows 95, 1995.
Using Visio Products, 1997, pp. 119–122, 185–202 and 207–232, Visio Corporation, Seattle.
Hyman, Dynamic HTML for Dummies, 1997, pp. 63–79, IDG Books, Foster City.
Lehto et al., Official Microsoft FrontPage 98 Book, 1997, pp. 32–52, Microsoft Press, Redmond.
Tittel et al., HTML 4 for Dummies, 1998, pp. 12–13 and 283–293, IDG Books, Foster City.
"Aurigin Announces General Availability of Version 6.0 of its Intellectual Property Asset Management System," Web page from Aurigin Systems, Oct. 1998.
"The Brain," Web page from PC Magazine Online, Apr. 1998.
"Roland Introduces HPD–15 HandSonic Hand Percussion Pad", Feb. 3, 2000, Roland Corporation U.S., Los Angeles.
"HPD–15 HandSonic", printed from the Internet on Jan. 3, 2001, http://209.144.99.11/PRODUCTS/hardware/hpd15.htm.

\* cited by examiner

Primary Examiner—Kenneth R. Coulter

(57) ABSTRACT

A browsing session is provided to a user based on a tree which relates a plurality of computer-readable items. In response to a user-initiated selection of a first item in the tree, at most two of the items are outputted and/or retrieved before receiving a subsequent user-initiated selection of another item in the tree. If the first item is an internal item of the tree, a child of the first item in the tree is outputted and/or retrieved. If the first item has a sibling in the tree which has not been outputted and/or retrieved within the browsing session, the sibling is outputted and/or retrieved.

17 Claims, 4 Drawing Sheets

METHODS, ARTICLES AND APPARATUS FOR PROVIDING A BROWSING SESSION

RELATED APPLICATIONS

The present application is related to the application entitled "METHODS, ARTICLES AND APPARATUS FOR VISIBLY REPRESENTING INFORMATION AND FOR PROVIDING AN INPUT INTERFACE", having Ser. No. 09/243,595, filed Feb. 3, 1999 now U.S. Pat. No. 6,359,635, whose disclosure is hereby incorporated by reference into the disclosure of the present application, and the application entitled "BROWSING METHODS, ARTICLES AND APPARATUS", having Ser. No. 09/533,545, filed Mar. 23, 2000, now U.S. Pat. No. 6,460,021 whose disclosure is hereby incorporated by reference into the disclosure of the present application.

TECHNICAL FIELD

The present invention relates to browsing methods, articles and apparatus.

BACKGROUND OF THE INVENTION

Many Internet portals provide a search engine with which a user may initiate an Internet search. The search engine returns a list of Web pages based upon a search expression received from the user.

Some search engines display a similarity value for each Web page in the list. Each similarity value numerically indicates a degree of correlation or relevance between its corresponding Web page and the search expression.

Oftentimes, the Web pages in the list are sorted based on the similarity values. By sorting the Web pages in this manner, the list presents highly-relevant Web pages before lesser-relevant Web pages.

Typically, the user selects a Web page from the list by clicking on an associated hyperlink. In response thereto, the Web page is retrieved via the Internet and displayed for the user. Upon viewing the Web page, the end user may return to the list to select another Web page. In response thereto, the other Web page is retrieved via the Internet and displayed for the user.

In some cases, a resulting selection-to-display time for a Web page is undesirably long for the user. The selection-to-display time may be undesirable if a low-speed modem is used, if the computer network is congested, and/or if the server providing the Web page is heavily utilized, for example.

Web browsing software typically provides a cache feature wherein local copies of previously-displayed Web pages are stored. By caching a previously-displayed Web page, the selection-to-display time may be reduced when returning to the Web page. However, the selection-to-display time for initially displaying the Web page may remain undesirable.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF PREFERRED EMBODIMENTS

Improved methods, articles and apparatus for providing a browsing session to a user are disclosed herein. The browsing session is based on a tree which relates a plurality of computer-readable items. In response to a user-initiated selection of a first item in the tree, at most two of the items are outputted and/or retrieved before receiving a subsequent user-initiated selection of another item in the tree. If the first item is an internal item of the tree, a child of the first item in the tree is outputted and/or retrieved. If the first item has a sibling in the tree which has not been outputted and/or retrieved within the browsing session, the sibling is outputted and/or retrieved.

The at most two of the items are stored in a cache local to the user to anticipate a user-selection thereof. In response to being user-selected, an item is retrieved from the local cache and displayed, and at most two more of the items are outputted and/or retrieved in the aforementioned manner for storage in the local cache. Thus, items are stored in the cache prior to being initially displayed.

Locally retrieving the user-selected item from the cache is desirable to reduce the selection-to-display time for initially displaying the item. Remotely retrieving either zero, one or two anticipated items (in contrast to all others of the items) while displaying the user-selected item is desirable to address communication channel usage in browsing applications. Choosing one child and/or one sibling to be the at most two items is desirable to anticipate further selections by the user.

Figure 1:
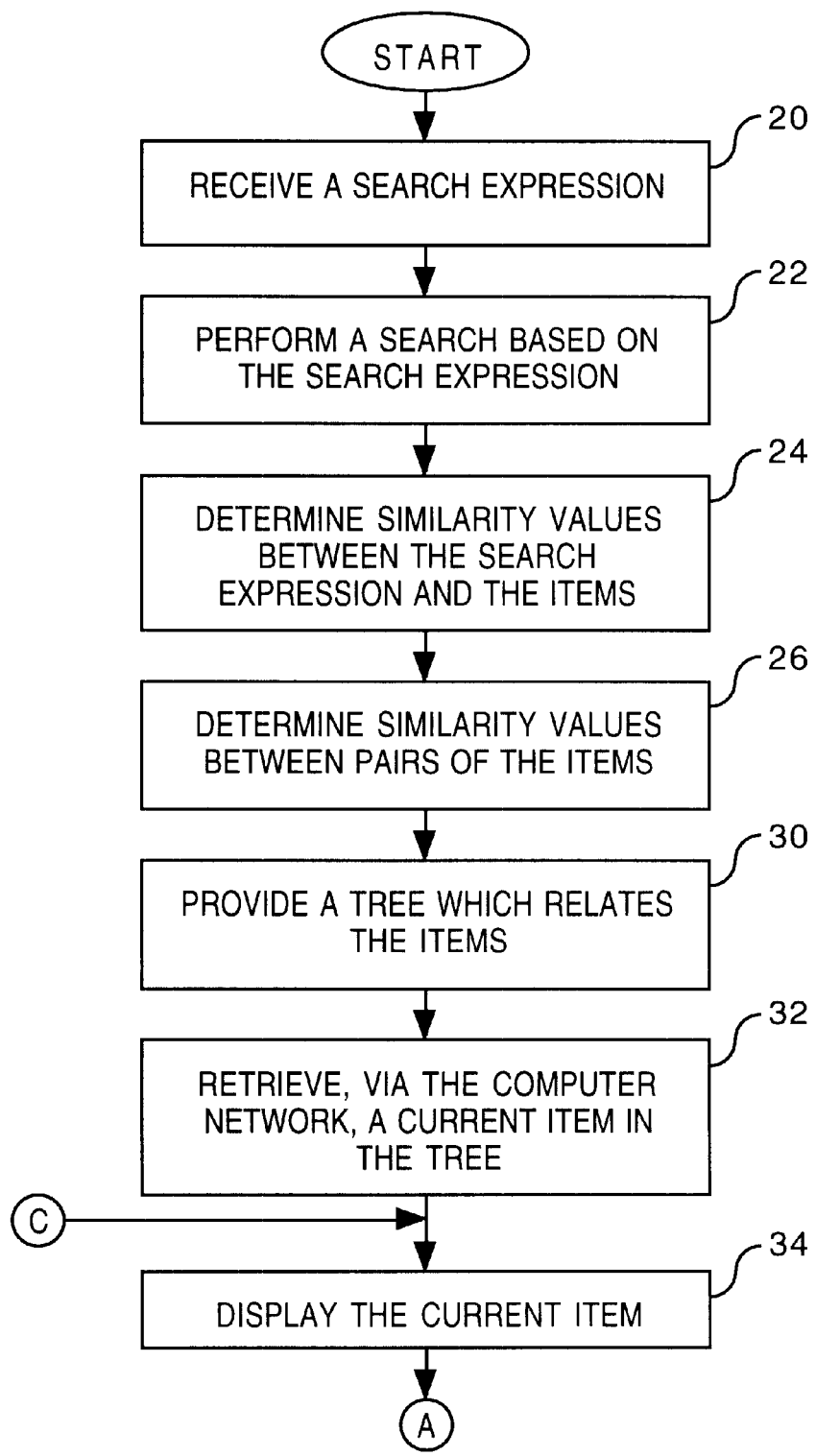
FIGS. 1, 2 and 3 provide a flow chart of an embodiment of a method of providing a browsing session to a user.
Figure 2:
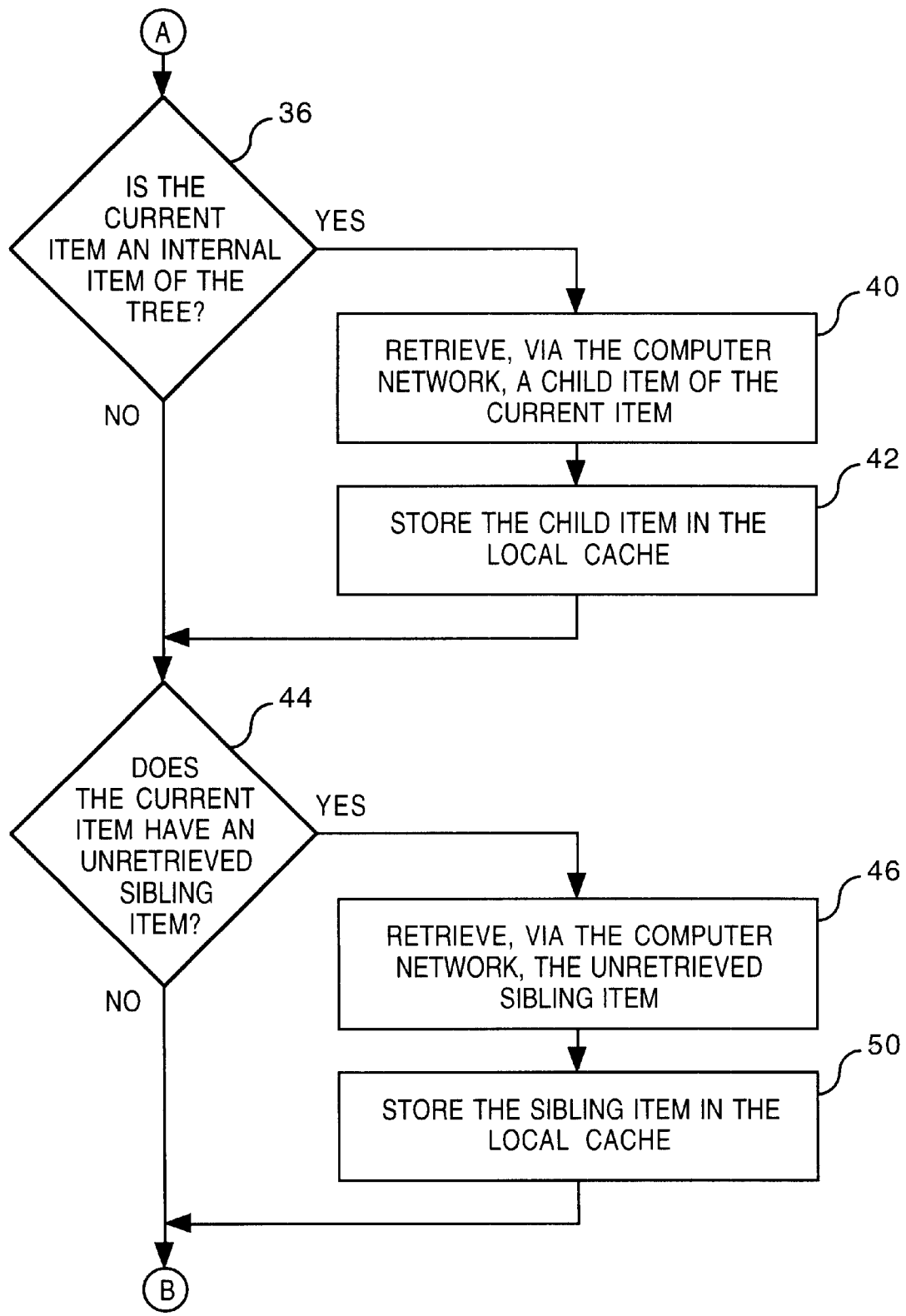
Figure 3:
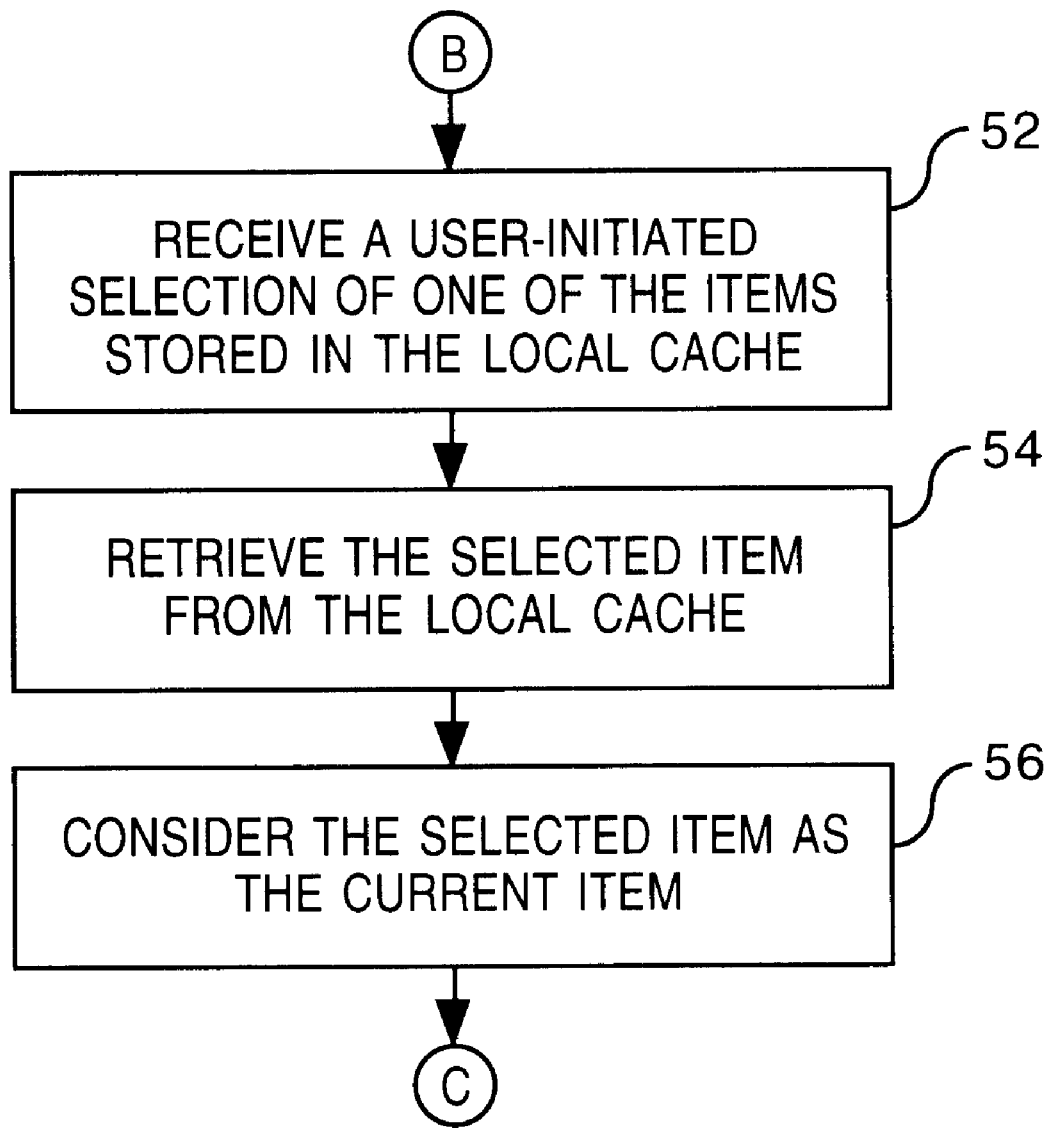

FIGS. 1, 2 and 3 provide a flow chart of an embodiment of a method of providing a browsing session to a user. For purposes of illustration and example, the embodiment of the method of providing a browsing session is disclosed within the context of a search. It should be appreciated, however, that embodiments of the method may be performed absent the search.

As indicated by block 20, the method comprises receiving a search expression. The search expression may be user-entered using an input device such as a keyboard, a touch screen, a touch pad or a voice input device. The search expression may contain one or more words in the form of either a boolean search expression or a natural language search expression, for example. The search expression may include information from a plurality of user-enterable fields to limit the scope of the search. The search expression may include an image or encoded audio.

As indicated by block 22, a search is performed based on the search expression. The search yields search results comprising a plurality of computer-readable items, the plurality of computer-readable items being a subset of a larger set of computer-readable items.

Examples of a computer-readable item include, but are not limited to a computer address, a computer site, a Web page, audio content, an image, computer software, an information category, an information subcategory, an information source, a logical disk for a computer, a computer directory, a computer-readable file, computer-readable data, a computer-readable message, a computer-readable description and/or image of a physical object, a computer-readable description and/or image of a purchasable item, a general category, and a general subcategory. In general, the specific type of items which are to be browsed is application-dependent. Of particular interest are computer-readable items in a markup language such as HTML (hypertext markup language), HDML (handheld device markup language), or WML (wireless markup language). Also of interest are computer-readable messages such as those from either USENET or a Web page which provides an on-line discussion forum.

As indicated by block 24, the method optionally comprises determining a first plurality of similarity values between the search expression and the plurality of computer-readable items. Each of the first plurality of similarity values indicates a degree of similarity, relevance or correlation between the search expression and a corresponding one of the computer-readable items of the subset.

Referring back to block 22, the search results may consist of either a predetermined number of computer-readable items which are most similar to the search expression, or a number of computer-readable items whose similarity values with the search expression are beyond a threshold.

As indicated by block 26, the method optionally comprises determining a second plurality of similarity values between a corresponding plurality of pairs of the computer-readable items. Each of the second plurality of similarity values indicates a degree of similarity, relevance or correlation between a corresponding pair of computer-readable items of the subset.

As indicated by block 30, the method comprises providing a tree which relates the plurality of computer-readable items. Various computer-readable data structures can be used to represent the tree in a computer-readable form using a computer-readable medium.

Before proceeding, a review of trees and graph-related terminology is provided. A graph is definable by a set of nodes and a set of edges joining or associating different pairs of distinct nodes. The edges in the graph may be either directed or undirected.

Alternative terminology may be used to describe the graph. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the graph.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes. The level number of a node is defined as the number of edges in the path between the node and the root node. The height of the tree is the largest level number of any node.

If each internal node of a rooted tree has m children, the tree is called an m-ary tree. If m=1, the tree is unary. If m=2, the tree is binary. If m=3, the tree is ternary.

Referring back to block 30, each of the plurality of computer-readable items is represented by a corresponding node of the tree. Relationships between computer-readable items are represented by edges in the tree. Examples of edge-represented relationships between computer-readable items include, but are not limited to, a degree of similarity, a hyperlink, an associative link, a state of being an element of, a state of being contained in, a state of being associated with, a state of reporting to, a state of being in a category, a state of depending from, and a state of being a reply to.

It is preferred that the tree is non-unary. By being non-unary, the tree has at least one internal node with two or more child nodes. It is also preferred that the tree has a height of at least two. It is further preferred that the tree has more leaf nodes than a number of child nodes emanating from its root node.

The tree may be provided by determining an optimum path tree based upon the first plurality of similarity values and the second plurality of similarity values. The optimum path tree indicates a respective optimum path between the search expression and each of the plurality of computer-readable items.

The optimum path between the search expression and a computer-readable item has an optimum function value of similarity values between the search expression and the computer-readable item. Examples of the function whose optimum value dictates the optimum path include, but are not limited to, a sum of similarity values between the search expression and the computer-readable item, and a product of similarity values between the search expression and the computer-readable item. To determine an optimum product of similarity values, an additive optimum path algorithm may be performed on a logarithm of the similarity values.

As is known in the art of network algorithms, examples of algorithms to compute the shortest paths include, but are not limited to, Dijkstra's algorithm and Floyd's algorithm. Those having ordinary skill can review shortest path algorithms on pp. 123–127 of A. Tucker, *Applied Combinatorics*, Second Edition, John Wiley & Sons, 1984, which its hereby incorporated by reference into this disclosure.

Alternatively, the tree may be provided by determining a spanning tree based upon the first plurality of similarity values and the second plurality of similarity values. Examples of the spanning tree include, but are not limited to, an optimum spanning tree such as a minimum spanning tree, and a search tree.

The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

As is known in the art of network algorithms, examples of algorithms to compute a minimum spanning tree include, but are not limited to, Kruskal's algorithm and Prim's algorithm. Those having ordinary skill can review minimum spanning trees on pp. 127–131 of A. Tucker, *Applied Combinatorics*, Second Edition, John Wiley & Sons, 1984, which is hereby incorporated by reference into this disclosure.

Examples of the search tree include, but are not limited to, a depth-first search spanning tree, a breadth-first search spanning tree, or a best-first search spanning tree. Those having ordinary skill can review search trees on pp. 80–122 of A. Tucker, *Applied Combinatorics*, Second Edition, John Wiley & Sons, 1984, which is hereby incorporated by reference into this disclosure.

For computer-readable messages, an edge in the tree may indicate that one message is a reply to another message. Thus, a reply message is a child of its parent message, and two reply messages to the same parent message are siblings.

Each base message, i.e. each message that begins a new thread, may have an associated edge to a root node in the tree. If a search is performed, the root node may represent the search expression. Regardless of whether a search is performed, the root node may represent a discussion group of which the messages are elements.

As indicated by block 32, the method comprises retrieving a current item in the tree via a computer network. Examples of the computer network include, but are not limited to, an intranet, an internet and an extranet.

Initially, the current item may be the computer-readable item most similar to the search expression. Alternatively, the current item may be any user-selected computer-readable item in the tree.

As indicated by block 34, the method comprises displaying the current item. The current item is displayed by a visual display device and/or an audible display device. Examples of the visual display device include, but are not limited to, a computer monitor, a television, a liquid crystal display, a cathode ray tube, and a gas plasma display. Examples of the audible display device include, but are not limited to, an electroacoustic transducer and a speaker.

As indicated by block 36, the method comprises determining if the current item is an internal item of the tree. If so, a child item of the current item is retrieved via the computer network (as indicated by block 40) and stored in a local cache (as indicated by block 42).

As indicated by block 44, the method comprises determining if the current item has a sibling item in the tree which has not been retrieved within the browsing session. If so, the sibling item is retrieved via the computer network (as indicated by block 46) and stored in the local cache (as indicated by block 50).

As indicated by block 52, the method comprises receiving a user-initiated selection of one of the items stored in the local cache. The selection is performed using an input device such as a pointing device, one of a series of keys, a rocker switch, or a voice input device. Examples of pointing devices include, but are not limited to, a mouse, a touch pad, a track ball, a joystick, a pointing stick, and a touch screen. Examples of keys include, but are not limited to, scroll control keys and cursor control keys. Examples of rocker switches include, but are not limited to, a two-way rocker switch and a four-way rocker switch.

Optionally, a first control may be provided for selecting the sibling item, and a second control may be provided for selecting the child item. Examples of the first control and the second control include, but are not limited to: a first position and a second position of a rocker switch; a first button and a second button of a mouse; a first spoken command and a second spoken command; a first user-selectable display region and a second user-selectable display region; and a first key and a second key of a keyboard.

Alternatively, a first control and/or a second control may be provided to select items in accordance with the teachings in the patent application having Ser. No. 09/533,545, which is incorporated by reference into the present disclosure.

In response to the user-initiated selection, the selected item is retrieved from the local cache, as indicated by block 54. The selected item is considered as the current item (block 56) and flow of the method is directed back to block 34. The selected item is displayed (block 34) and either zero, one or two additional items are retrieved and stored (blocks 36 to 50).

An apparatus for performing embodiments of the herein-disclosed method may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be, embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory. Examples of computer-readable communication media include, but are not limited to, an optical medium, an electronic medium, and an electromagnetic medium.

The computer is coupled to a display to display the computer-readable items described herein and other visible information to an end user. Optionally, the display may visibly display user-selectable regions for the first control and the second control. Examples of the display include any of the herein-disclosed display devices.

The computer receives user-initiated selections and other user input from one or more user input devices. Examples of the one or more user input devices include any of the herein-disclosed input devices. The computer processes the user input and/or communicates at least one signal based upon the user input. The display and the one or more user input devices facilitate user interaction with the computer.

The computer includes a transceiver to communicate with the computer network. Examples of the transceiver include, but are not limited to, a modem, a network interface, and a wireless transceiver.

The computer includes at least one memory to provide the local cache. Examples of the at least one memory include, but are not limited to, the aforementioned examples of the computer memory.

Embodiments of the herein-disclosed methods and examples can be performed using either a single computer or a plurality of computers. A plurality of computers may cooperate in a client-server fashion, for example.

An example is given to illustrate one embodiment of a method and apparatus for browsing a plurality of items. As should be appreciated, the scope of the present disclosure is not to be limited by this example. Other practical applications are contemplated based on the examples given in the patent applications having Ser. No. 09/243,595 and Ser. No. 09/533,545.

Consider an end user inputting a search expression using a user-input device of a handheld computer. The handheld computer has a wireless transceiver to communicate with a computer network, a processor responsive to the user-input device and in communication with the wireless transceiver, a display device responsive to the processor, and a memory to provide a local cache.

Using the wireless transceiver, the search expression is submitted to a Web site which provides a search engine. The search engine performs a search based on the search expression.

For purposes of illustration and example, consider the search engine generating eight items based on the search expression. Based on similarity values, the search engine determines an optimum path tree indicating a respective optimum path between the search expression and each of the eight items. In this example, the similarity values are numerical values between 0% and 100%. An additive minimum path algorithm is performed on a negative logarithm of the non-zero similarity values, e.g. −log(similarity value), to determine a maximum product of similarity values.

Figure 4:
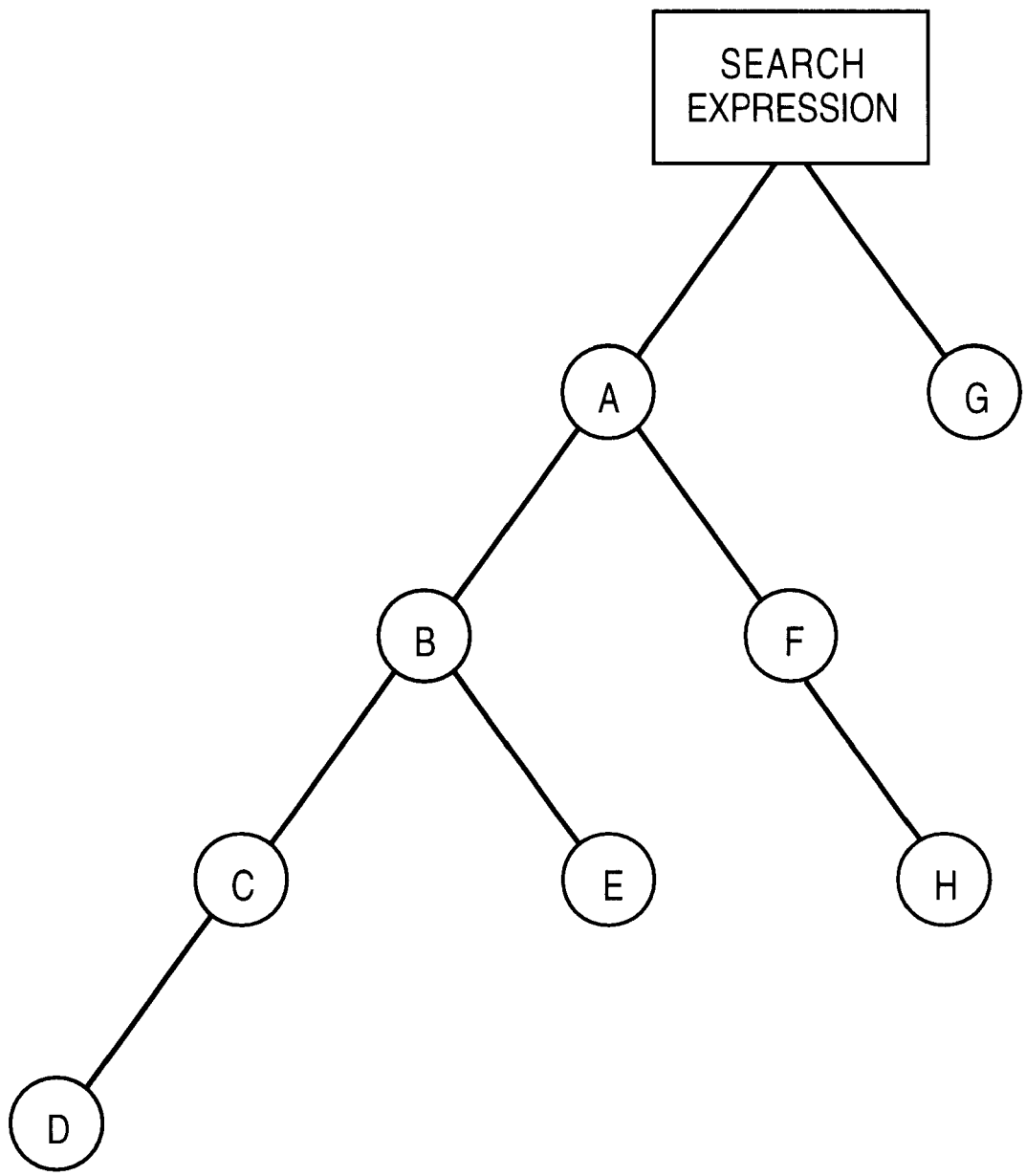
FIG. 4 schematically shows an example of a tree upon which a browsing session is based.

FIG. 4 schematically shows the optimum path tree. Each item is represented by a circle. The search expression is represented by a rectangle. The search expression is the root node in the tree. The search engine determines that item A, which is most similar to the search expression, is to be the first displayed item.

The Web site communicates eight uniform resource locators (URLs) corresponding to the eight items, and a computer-readable representation of the tree to the handheld computer. The handheld computer receives the URLs and the tree using the wireless transceiver.

Using the wireless transceiver, the handheld computer retrieves item A via the computer network by linking to its corresponding URL. Item A is displayed using the display device.

While item A is being displayed, item B (which is a child of item A) and item G (which is an unretrieved sibling of A) are retrieved via the computer network using the wireless transceiver, and stored in the local cache. Items B and G are retrieved by linking to their corresponding URLs. The handheld computer provides a first control to select item G and a second control to select item B.

After viewing item A, consider the end user selecting item B using the second control. In response thereto, item B is retrieved from the local cache and displayed using the display device.

While item B is being displayed, item C (which is a child of item B) and item F (which is an unretrieved sibling of B) are retrieved via the computer network using the wireless transceiver, and stored in the local cache. Items C and F are retrieved by linking to their corresponding URLs. The handheld computer provides a first control to select item F and a second control to select item C.

After viewing item B, consider the end user wishing to skip the other tree-descendant items from item B. To skip these items, the end user uses the first control to select item F. In response thereto, item F is retrieved from the local cache and displayed using the display device.

While item F is being displayed, item H (which is a child of item F) is retrieved via the computer network using the wireless transceiver and stored in the local cache. Item H is retrieved by linking to its corresponding URL. Since all siblings of item F, namely item B, have been retrieved within the browsing session, only one of the items (item H) is retrieved while item F is being displayed. The handheld computer provides a first control to select item G and a second control to select item H.

After viewing item F, consider the end user wishing to skip any tree-descendant items from item F. To skip these items, the end user uses the first control to select item G. In response thereto, item G is retrieved from the local cache and displayed using the display device. Since item G is not an internal item of the tree, and all siblings of item G, namely item A, have been retrieved within the browsing session, none of the items are retrieved via the computer network while item G is being displayed.

As an alternative to having the user's apparatus process the user-initiated selections, an apparatus remote from the user may process the user-initiated selections. The remote apparatus may comprise a server accessible via the computer network. Optionally, the server also provides the search engine described herein.

The server receives a user-initiated selection of a computer-readable item via the computer network. In response thereto, the server outputs either a child item, a sibling item, a child item and a sibling item, or none of the items, in accordance with FIGS. 1, 2 and 3. The user's apparatus receives, via the computer network, any items outputted by the server. The user's apparatus stores any received items in the local cache.

The above-described methods may be augmented with other acts. For example, the method may further comprise outputting a signal to display a visible representation of the tree to the user. In this case, the visible representation may be determined and provided in accordance with the teachings in the patent application having Ser. No. 09/243,595, which is incorporated by reference into the present disclosure.

As another example, the method may further comprise outputting a signal to display a user-viewable advertisement. The signal to display the user-viewable advertisement may encode an image and/or graphics in the advertisement, or may provide a link to an image and/or graphics in the advertisement. The user-viewable advertisement may be viewable by the user while a computer-readable item is being displayed, and/or while at least one of the first control and the second control is selectable by the user. Here, for example, the user-viewable advertisement, the current computer-readable item, and the first control and the second control may be contained within a single Web page.

As a further example, the above-described methods may be augmented to perform an act based on the current item. The act may be performed in response to receiving a user action via an input device, such as any of those described with reference to block 52. The act may include, but is not limited to, any of the following examples. If the plurality of computer-readable items are associated with purchasable items, the act may include: providing information for the particular purchasable item, and/or performing a transaction for the particular purchasable item. If the plurality of computer-readable items include a plurality of computer addresses, the act may include linking to the particular computer address. If the plurality of computer-readable items include a plurality of computer-readable files, the act may include opening the computer-readable file. If the plurality of computer-readable items include a plurality of records from a database, the act may include any combination of retrieving, processing, displaying, modifying, or deleting the record from the database.

It is noted that the present disclosure contemplates methods, articles, apparatus, and examples which include an act of providing a link to a computer site which performs an embodiment of any of the herein-disclosed methods and examples. The present disclosure also contemplates methods, articles, apparatus, and examples which include an act of providing a user-viewable advertisement for a computer site which assists in performing an embodiment of any of the herein-disclosed methods and examples. The user-viewable advertisement may be communicated to the end user from either an advertisement provider or the computer site. The present disclosure further contemplates methods, articles, apparatus, and examples which include an act of receiving a hit from an end user who has hyperlinked from a computer site which performs an embodiment of any of the herein-disclosed methods and examples. Each of the aforementioned computer sites may include an internet site, a Web site, or another site accessible via a computer network.

Still further, the present disclosure contemplates retrieving computer-readable items from a first local computer memory (rather than from a remote source via a computer network) for caching in a second local computer memory. For example, the first local computer memory may comprise a hard disk and the second local computer memory may comprise a random access memory (RAM) disk.

It will be apparent to those skilled in the art that the disclosed inventions may be modified in numerous ways and may assume many embodiments other than the preferred forms specifically set out and described herein. For example, the acts described with reference to FIGS. 1 to 3 may be executed in an order other than that indicated by FIGS. 1 to 3. Further, some of the acts may be performed in parallel. Accordingly, it is intended by the appended claims to cover all modifications which fall within the true spirit and scope of the present invention.

What is claimed is:

1. A method of providing a browsing session to a user, the method comprising:

(a) providing a tree which relates a plurality of computer-readable items; and (b) in response to a user-initiated selection of a first computer-readable item in the tree:
retrieving the first computer-readable item from a local cache;
displaying the first computer-readable item;
retrieving exactly two of the computer-readable items via a computer network, the exactly two of the computer-readable items consisting of a second computer-readable item which is a child of the first computer-readable item in the tree and a third computer-readable item which is a sibling of the first computer-readable item in the tree and had not been retrieved within the browsing session; and
storing the second computer-readable item and the third computer-readable item in the local cache.

2. The method of claim 1 further comprising, after (b):
(c) in response to a user-initiated selection of the second computer-readable item in the tree:
retrieving the second computer-readable item from the local cache;
displaying the second computer-readable item;
retrieving exactly two of the computer-readable items via the computer network, the exactly two of the computer-readable items consisting of a fourth computer-readable item which is a child of the second computer-readable item in the tree and a fifth computer-readable item which is a sibling of the second computer-readable item in the tree; and
storing the fourth computer-readable item and the fifth computer-readable item in the local cache.

3. The method of claim 1 further comprising, after (b):
(c) in response to a user-initiated selection of the third computer-readable item in the tree:
retrieving the third computer-readable item from the local cache;
displaying the third computer-readable item;
retrieving exactly two of the computer-readable items via the computer network, the exactly two of the computer-readable items consisting of a fourth computer-readable item which is a child of the third computer-readable item in the tree and a fifth computer-readable item which is a sibling of the third computer-readable item in the tree and had not been retrieved within the browsing session; and
storing the fourth computer-readable item and the fifth computer-readable item in the local cache.

4. The method of claim 1 wherein the first computer-readable item comprises a first Web page, the second computer-readable item comprises a second Web page, and the third computer-readable item comprises a third Web page.

5. The method of claim 1 wherein the first computer-readable item comprises a first message, the second computer-readable item comprises a second message, and the third computer-readable item comprises a third message, wherein the second message is a reply to the first message, and wherein the first message and the third message are replies to a fourth message.

6. The method of claim 1 further comprising:
determining a first plurality of similarity values between a search expression and the computer-readable items; and
determining a second plurality of similarity values between a corresponding plurality of pairs of the computer-readable items;
wherein said providing a tree comprises determining an optimum path tree based upon the first plurality of similarity values and the second plurality of similarity values, the optimum path tree indicating a respective optimum path between the search expression and each of the plurality of computer-readable items.

7. The method of claim 1 further comprising:
determining a first plurality of similarity values between a search expression and the computer-readable items; and
determining a second plurality of similarity values between a corresponding plurality of pairs of the computer-readable items;
wherein said providing a tree comprises determining an optimum spanning tree based on the first plurality of similarity values and the second plurality of similarity values.

8. An apparatus for providing a browsing session based on a tree which relates a plurality of computer-readable items, the apparatus comprising:
a transceiver to communicate with a computer network;
at least one user input device to receive user-initiated selections;
a processor responsive to the at least one input device and in communication with the transceiver;

a display device responsive to the processor; and at least one memory in communication with the processor to provide a local cache;

wherein the processor is responsive to a user-initiated selection of a first computer-readable item in the tree to:

retrieve the first computer-readable item from the local cache;

display the first computer-readable item using the display device;

retrieve exactly two of the computer-readable items via the computer network using the transceiver, the exactly two of the computer-readable items consisting of a second computer-readable item which is a child of the first computer-readable item in the tree and a third computer-readable item which is a sibling of the first computer-readable item in the tree and had not been retrieved within the browsing session; and store the second computer-readable item and the third computer-readable item in the local cache.

9. The apparatus of claim 8 wherein the processor is responsive to a subsequent user-initiated selection of the second computer-readable item in the tree to:

retrieve the second computer-readable item from the local cache;

display the second computer-readable item using the display device;

retrieve exactly two of the computer-readable items via the computer network using the transceiver, the exactly two of the computer-readable items consisting of a fourth computer-readable item which is a child of the second computer-readable item in the tree and a fifth computer-readable item which is a sibling of the second computer-readable item in the tree; and store the fourth computer-readable item and the fifth computer-readable item in the local cache.

10. The apparatus of claim 8 wherein the processor is responsive to a subsequent user-initiated selection of the third computer-readable item in the tree to:

retrieve the third computer-readable item from the local cache;

display the third computer-readable item using the display device;

retrieve exactly two of the computer-readable items via the computer network using the transceiver, the exactly two of the computer-readable items consisting of a fourth computer-readable item which is a child of the third computer-readable item in the tree and a fifth computer-readable item which is a sibling of the third computer-readable item in the tree and had not been retrieved within the browsing session; and store the fourth computer-readable item and the fifth computer-readable item in the local cache.

11. The apparatus of claim 8 wherein the first computer-readable item comprises a first Web page, the second computer-readable item comprises a second Web page, and the third computer-readable item comprises a third Web page.

12. The apparatus of claim 8 wherein the first computer-readable item comprises a first message, the second computer-readable item comprises a second message, and the third computer-readable item comprises a third message, wherein the second message is a reply to the first message, and wherein the first message and the third message are replies to a fourth message.

13. A computer-readable medium for providing a browsing session based on a tree which relates a plurality of computer-readable items, the computer-readable medium comprising computer-readable content which directs a computer to respond to a user-initiated selection of a first computer-readable item in the tree to:

retrieve the first computer-readable item from a local cache;

display the first computer-readable item;

retrieve exactly two of the computer-readable items via a computer network, the exactly two of the computer-readable items consisting of a second computer-readable item which is a child of the first computer-readable item in the tree and a third computer-readable item which is a sibling of the first computer-readable item in the tree and had not been retrieved within the browsing session; and store the second computer-readable item and the third computer-readable item in the local cache.

14. The computer-readable medium of claim 13 wherein the computer-readable content directs the computer to respond to a subsequent user-initiated selection of the second computer-readable item in the tree to:

retrieve the second computer-readable item from the local cache;

display the second computer-readable item;

retrieve exactly two of the computer-readable items via the computer network, the exactly two of the computer-readable items consisting of a fourth computer-readable item which is a child of the second computer-readable item in the tree and a fifth computer-readable item which is a sibling of the second computer-readable item in the tree; and store the fourth computer-readable item and the fifth computer-readable item in the local cache.

15. The computer-readable medium of claim 13 wherein the computer-readable content directs the computer to respond to a subsequent user-initiated selection of the third computer-readable item in the tree to:

retrieve the third computer-readable item from the local cache;

display the third computer-readable item;

retrieve exactly two of the computer-readable items via the computer network, the exactly two of the computer-readable items consisting of a fourth computer-readable item which is a child of the third computer-readable item in the tree and a fifth computer-readable item which is a sibling of the third computer-readable item in the tree and had not been retrieved within the browsing session; and store the fourth computer-readable item and the fifth computer-readable item in the local cache.

16. The computer-readable medium of claim 13 wherein the first computer-readable item comprises a first Web page, the second computer-readable item comprises a second Web page, and the third computer-readable item comprises a third Web page.

17. The computer-readable medium of claim 13 wherein the first computer-readable item comprises a first message, the second computer-readable item comprises a second message, and the third computer-readable item comprises a third message, wherein the second message is a reply to the first message, and wherein the first message and the third message are replies to a fourth message.

* * * * *